United States Patent [19]

Moate

[11] Patent Number: 4,925,373

[45] Date of Patent: May 15, 1990

[54] LUBRICATION PUMP

[75] Inventor: Peter D. Moate, Hartley, England

[73] Assignee: Interlube Systems Limited, Devon, England

[21] Appl. No.: 204,596

[22] Filed: Jun. 9, 1988

[30] Foreign Application Priority Data

Jun. 9, 1987 [GB] United Kingdom ................. 8713438

[51] Int. Cl.⁵ ............................................. F04B 35/00
[52] U.S. Cl. .................................... 417/372; 417/415; 417/373; 184/6.22; 165/185
[58] Field of Search ................. 184/6.22, 104.1, 104.2; 417/366, 371, 415, 360, 419, 423.8, 423.13, 424.1, 423.14, 423.15, 423.1, 423.9, 423.7, 423.3, 572; 165/47, 80.1, 185; 74/467

[56] References Cited

U.S. PATENT DOCUMENTS

| | | |
|---|---|---|
| 1,294,022 | 2/1919 | Anderson .......................... 184/104.1 |
| 1,332,970 | 3/1920 | Berres . |
| 1,333,547 | 3/1920 | Johnson . |
| 1,351,716 | 8/1920 | Cochrane .......................... 184/104.2 |
| 1,493,727 | 5/1924 | Bennett . |
| 1,715,408 | 6/1929 | Christensen .......................... 92/144 |
| 1,967,385 | 7/1934 | Replogue .......................... 92/144 |
| 2,065,350 | 12/1936 | Steenstrup .......................... 92/144 |
| 2,082,786 | 6/1937 | Bijur . |
| 2,228,364 | 1/1941 | Philipp .......................... 417/372 |
| 2,319,934 | 5/1943 | Korte et al. . |
| 2,500,524 | 3/1950 | Davis . |
| 2,624,491 | 1/1953 | Bills et al. . |
| 3,266,562 | 8/1966 | Navarro .......................... 165/47 |
| 3,412,903 | 11/1968 | Van Riper, Jr. et al. . |
| 4,275,995 | 6/1981 | Taylor .......................... 417/360 |
| 4,411,599 | 10/1983 | Kessel .......................... 417/423.11 |
| 4,587,912 | 5/1986 | Wolff et al. .......................... 184/104.1 |

FOREIGN PATENT DOCUMENTS

| | | |
|---|---|---|
| 289310 | 2/1915 | Fed. Rep. of Germany . |
| 380458 | 9/1964 | Switzerland . |
| 570353 | 7/1945 | United Kingdom . |
| 1104805 | 2/1968 | United Kingdom . |
| 2054755 | 2/1981 | United Kingdom . |

Primary Examiner—Louis J. Casaregola
Assistant Examiner—Robert N. Blackmon
Attorney, Agent, or Firm—Merchant, Gould, Smith, Edell, Welter & Schmidt

[57] ABSTRACT

A lubrication pump includes a reservoir 2 for a supply of lubricant, the reservoir having an outlet 5 at its lower end. A motor 10 is situated within the reservoir 2 and a thermally-conducting heat distributor 19 is mounted in thermal communication with the motor 10 to extend outwardly beyond the motor in the region of the bottom of the reservoir 2. Heat produced by operation of the motor 10 is distributed by the heat distributor 19, thereby reducing temperature differences in the lubricant within the reservoir 2 and improving the flow of lubricant to the outlet 5.

8 Claims, 2 Drawing Sheets

LUBRICATION PUMP

This invention relates to a lubrication pump and, more particularly but not exclusively, to a pump for an automatic, multi-line lubrication system.

Multi-line lubrication systems are used in a wide range of industrial applications including commercial vehicles and are able to supply each of a large number of bearings with the correct quantity of lubricant without the need to stop the machine or vehicle. Such a system ensures that no bearing is starved of lubricant, and thereby helps to prevent premature bearing failure.

A known multi-line lubrication system consists, generally, of the following components: a reservoir of fluid grease, a distribution system of small bore nylon tubing, each individual tube being connected to a different bearing in the machine, and a pump for injecting a measured quantity of lubricant into each tube of the distribution system at regular intervals.

A pump for the system is driven by an electric motor which is situated within a housing inside the lubricant reservoir. A pumping chamber is situated underneath the reservoir, and the motor drives a plurality of individual pumping units in the pumping chamber via a cam shaft. As lubricant is pumped into the distribution system, the pumping chamber is replenished by lubricant which flows through an outlet in the region of the centre of the bottom of the reservoir.

Although pumps of the type described above are generally very reliable, we have found that in low ambient temperatures, air can be drawn into the distribution system causing a deterioration in the efficiency of the system. We have found that the low ambient temperature causes the temperature of grease around the periphery of the reservoir to drop by more than that of the grease near the centre of the reservoir, which is warmed by the heat produced by the electric motor. As the viscosity of the grease increases with a drop in temperature, the grease at the centre of the reservoir remains more fluid than that around the edge, and so flows more readily into the pumping chamber. As a result the centre of the reservoir may be emptied of grease and air drawn into the distribution system even though a substantial amount of grease remains around the edges of the reservoir. This phenomenon is referred to later in the specification as "slumping".

It is an object of the present invention to provide a lubrication pump in which the problem referred to above is mitigated.

According to the present invention there is provided a lubrication pump including a reservoir for a supply of lubricant, a motor situated within the reservoir, and a thermally-conducting heat distributor mounted in thermal communication with the motor and extending outwardly beyond the motor in the region of the bottom of the reservoir to distribute heat produced by operation of the motor to a region of the reservoir spaced from the motor.

The heat distributor helps to prevent the creation of excessive temperature differences within the lubricant and thereby avoid problems associated with "slumping" of the lubricant. The performance of the pump at low temperatures is thereby improved.

The outwardly extending portion of the heat distributor is preferably solid and an outlet of the reservoir provided below the heat distributor whereby lubricant flowing to the outlet of the reservoir is diverted around the heat distributor. Such an arrangement further helps to avoid "slumping" since it is impossible for lubricant to flow straight downwards to the outlet from the middle of the reservoir.

The downwardly projected area of the heat distributor and motor preferably represents at least one third of the overall internal cross-sectional area of the region of the bottom of the reservoir in which the outwardly extending portion of the heat distributor is located. This ensures that the heat distributor has a significant effect. In an embodiment of the invention to be described later with reference to the drawings, the downwardly projected area of the heat distributor and motor is slightly more than one half of the overall internal cross-sectional area of the region of the bottom of the reservoir.

The motor may include a housing of plastics material, that housing defining the boundary between lubricant in the reservoir and the motor. The plastics material of the housing is a poorer conductor of heat than the heat distributor so that only a limited amount of heat passes to the lubricant through the housing.

The motor may have a drive shaft extending through the bottom of the reservoir and the heat distributor may be placed around the drive shaft.

The pump preferably includes thermally-conducting fixing means which attach the heat distributor to the motor, the fixing means providing a thermal pathway between the motor and the heat distributor.

The heat distributor may have a cylindrical body portion and an annular plate portion extending outwardly therefrom.

An electrical heating element may be provided for increasing the rate of heat transfer to the lubricant. The heating element may be mounted in thermal communication with the heat distributor.

While it is preferable for the heat distributor to be solid and act also to divert the flow of lubricant, this is not essential. Similarly, if the heat distributor is solid it is not essential for it to act to distribute heat: it may act simply as a flow diverter. Thus the present invention also provides a lubrication pump including a reservoir for a supply of lubricant having an outlet in the bottom, a motor situated within the rservoir, and a flow diverting member located in the region of the bottom of the reservoir and extending outwardly over and beyond the outlet to divert lubricant flowing to the outlet.

According to another aspect of the invention there is provided a lubricant distribution system including a pump as defined above.

According to a further aspect of the invention there is provided a heat distributor for a lubrication pump having a lubricant reservoir and a motor, including a hollow, cylindrical body portion, an annular plate portion attached to the body portion and extending outwardly therefrom and means for securing the distributor to the motor in thermal communication therewith, whereby heat generated by operation of the motor may be distributed to the lubricant in the reservoir.

By way of example, an embodiment of the invention will now be described with reference to the following drawings, of which:

Figure 1:
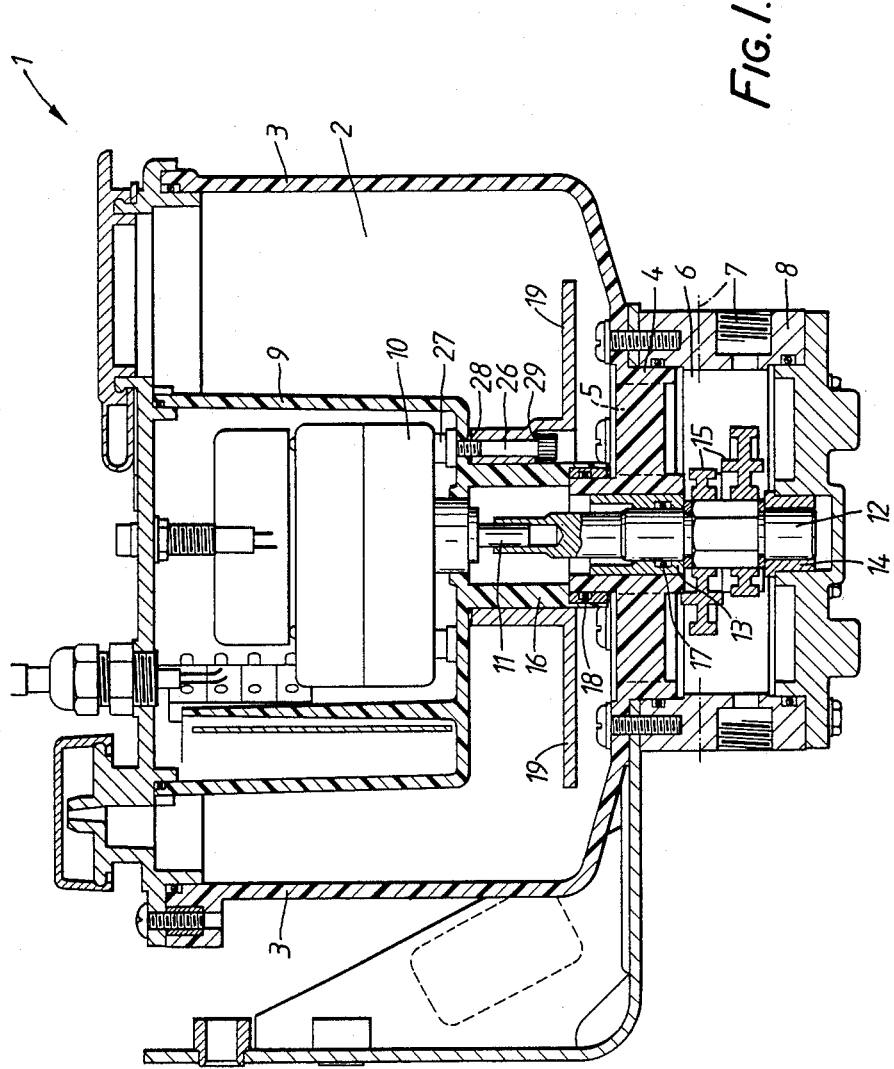
FIG. 1 is a sectional side view of a lubrication pump.

As shown in FIG. 1, the pump has a moulded plastics lubricant reservoir 2 of generally cylindrical shape, having a peripheral wall 3 and a base 4. A number of openings 5 extend through the base 4, providing a passageway from the reservoir 2 to a pumping chamber 6 which is situated below the reservoir. A plurality of outlet openings 7 extend radially through the cylindrical wall 8 of the pumping chamber 6, the outlets being arranged, in this embodiment, in two staggered, axially-displaced groups. In other forms of the pump one, three or more axially-displaced groups of outlets are provided. Each outlet is threaded to receive a positive displacement pumping unit (not shown) of, for example, the type sold under the Trade Mark "Interlube 78034", each of which is connected to a respective line of a multi-line lubricant distribution system (not shown).

Mounted in a plastics housing 9, which is located within the reservoir 2, is a geared A.C. synchronous motor 10. The drive shaft 11 of the motor 10 is connected to a cam shaft 12 which extends into the pumping chamber 6. The cam shaft 12 is supported towards its upper end by a bearing 13 located in the centre of the base 4, and at its lower end by a bearing 14 located in the base of the pumping chamber 6. In this embodiment, in which two axially-displaced groups of outlets are provided, tow cams 15 are mounted on the cam shaft 12 between the bearings 13 and 14, to actuate the pumping units (not shown). The upper end of the cam shaft 12 is enclosed within a plastics casing 16 which is formed integrally with the motor housing 9, and rubber O-rings 17, 18 are provided respectively in the bearing 13 and at the joint between the cam shaft casing 16 and the base plate 4 to prevent the ingress of lubricant into the motor housing 9.

Figure 2:
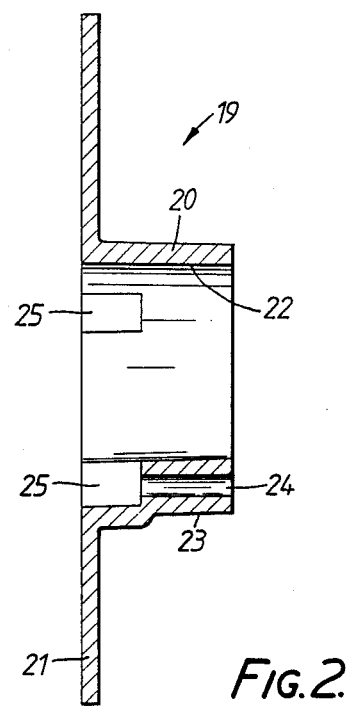
FIG. 2 is a sectional side view of a part of the lubrication pump.
Figure 3:
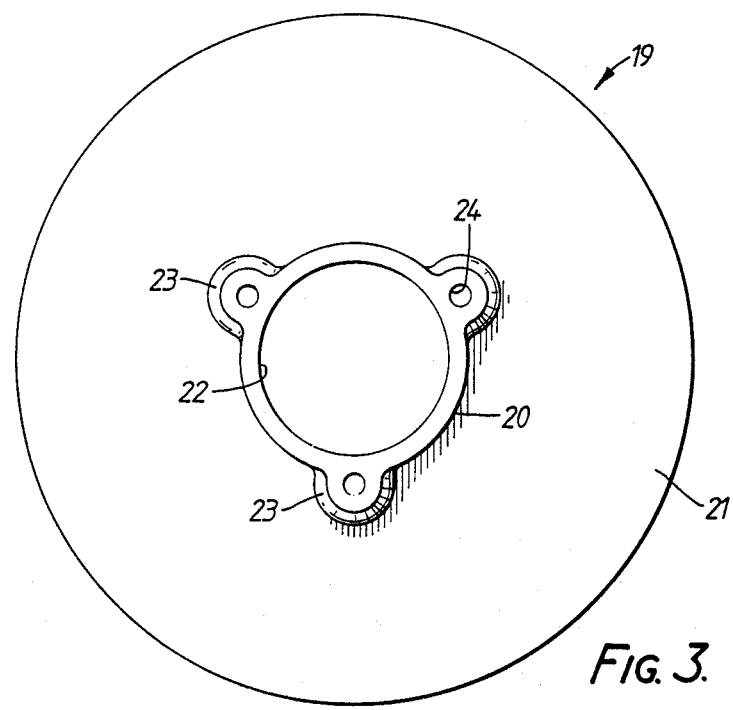
FIG. 3 is a plan view of the part of the lubrication pump shown in FIG. 2.

Mounted on the outer surface of the casing 16 and projecting across the reservoir 2 in the region of the bottom of the reservoir, is a metal heat distributor 19. As shown most clearly in FIGS. 2 and 3, the heat distributor 19 has a cylindrical body portion 20, at a lower end of which is a coaxial solid annular plate portion 21 forming an outwardly-extending, radial flange. The area over which the heat distributor extends (including the cylindrical portion 20) is a little over half the overall internal cross-sectional area of the reservoir in this region. A circular bore 22 extends axially through the heat distributor 19. At each of three equiangularly-spaced points about the circumference of the body portion 20 there is provided a strengthening ridge 23 which extends along the length of the cylindrical body portion. A screw hole 24 extends along each of the ridges 23 through the heat distributor 19 in a direction parallel to the axis of the bore 22. Each screw hole 24 includes a portion 25 of increased diameter which is situated at the plate end of the heat distributor 19.

As shown in FIG. 1, the heat distributor 19 is attached to the motor housing 9 by three thermally conductive fixing screws 26 which extend respectively through the holes 24 and into feet 27 of the motor 10. A rubber gasket 28 between the device 19 and the housing 9 and metal seals 29 beneath the heads of the fixing screws 26 are provided to prevent the ingress of lubricant to the motor housing. The fixing screws 26 and the metal seals 29 provide a thermal pathway between the motor 10 and the heat distributor 19.

When the pump 1 is in use, the reservoir 2 and the pumping chamber 6 contain a supply of a lubricant such as fluid grease. The motor 10 drives the cam shaft 12 with a cycle time of, typically, 12 minutes, causing the cams 15 to actuate each of the pumping units (not shown) in succession. The pumping units thereby repeatedly inject small quantities of the lubricant into the distribution system (not shown), the pumping chamber being continuously replenished from the reservoir 2 by the flow of lubricant through the openings 5 in the base 4.

Heat generated by operation of the motor 10 flows from the feet 27 of the motor 10 into the fixing screws 26 and then via the metal seals 29 into the heat-distributor 19. This heat is dispersed to the lubricant in the reservoir 2 by the heat distributor 19, thereby reducing temperature differences created within the lubricant. Furthermore, as lubricant flows from the reservoir 2 into the pumping chamber 6, lubricant which is in the centre of the reservoir adjacent the motor. Housing 9 is diverted to flow away from the centre around the edge of the annular plate portion 21, before passing through the openings 5, and this flow pattern causes mixing of lubricant from different parts of the reservoir and further helps to reduce temperature gradients created within the lubricant. "Slumping" of the lubricant at very low ambient temperatures is thus prevented, avoiding the admitance of air to the lubricant distribution system.

If desired, the rate of heat transfer to the lubricant may be increased by the provision of a separate heating element. For example, a ceramic cased wire wound voltage dropping resistor may be mounted in thermal communication with the casing of the motor. When an electric current is supplied to the resistor, heat is produced which is transferred via the motor casing and the heat distributor to the lubricant.

What we claim is:

1. A lubrication pump including a reservoir for a supply of lubricant, a pump motor situated within the reservoir, and a thermally-conducting heat distributor mounted in thermal communication with the motor and extending outwardly beyond the motor in the region of the bottom of the reservoir to distribute heat produced by operation of the motor to a region of the reservoir spaced from the motor.

2. A pump according to claim 1 in which the outwardly extending portion of the heat distributor is solid and an outlet of the reservoir is provided below the heat distributor whereby lubricant flowing to the outlet of the reservoir is diverted around the heat distributor.

3. A pump according to claim 1 in which the downwardly projected area of the heat distributor and motor is at least one third of the overall internal cross-sectional area of the region of the bottom of the reservoir in which the outwardly extending portion of the heat distributor is located.

4. A pump according to claim 1 in which the motor includes a housing of plastics material which defines the boundary between lubricant in the reservoir and the motor.

5. A pump according to claim 1 in which the motor has a drive shaft extending through the bottom of the reservoir and the heat distributor is located around the drive shaft.

6. A pump according to claim 1 including thermally conducting fixing means which attach the heat-distributor to the motor, the fixing means providing a thermal pathway between the motor and the heat-distributor.

7. A pump according to claim 1 in which the heat distributor has a cylindrical body portion and an annular plate portion extending outwardly therefrom.

8. A heat distributor for a lubrication pump having a lubricant reservoir and a motor, including a hollow, cylindrical body portion, an annular plate portion attached to the body portion and extending outwardly therefrom and means for securing the distributor to the motor in thermal communication therewith, whereby heat generated by operation of the motor may be distributed to the lubricant in the reservoir.

* * * * *